(12) United States Patent
Svanberg et al.

(10) Patent No.: US 11,305,726 B2
(45) Date of Patent: Apr. 19, 2022

(54) RESTRAINING SYSTEM FOR A VEHICLE

(71) Applicant: Volvo Car Corporation, Gothenburg (SE)

(72) Inventors: Bo Svanberg, Gothenburg (SE); Lotta Jakobsson, Torslanda (SE); Katarina Bohman, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 132 days.

(21) Appl. No.: 16/454,147

(22) Filed: Jun. 27, 2019

(65) Prior Publication Data

US 2020/0031308 A1 Jan. 30, 2020

(30) Foreign Application Priority Data

Jul. 27, 2018 (EP) .................................... 18185957

(51) Int. Cl.
*B60R 22/12* (2006.01)
*B60R 22/14* (2006.01)
(Continued)

(52) U.S. Cl.
CPC ............ *B60R 22/12* (2013.01); *B60R 21/013* (2013.01); *B60R 22/14* (2013.01); *B60R 22/201* (2013.01);
(Continued)

(58) Field of Classification Search
CPC ......... B60R 21/02; B60R 22/12; B60R 22/14; B60R 22/201; B60R 22/46;
(Continued)

(56) References Cited

U.S. PATENT DOCUMENTS 5,330,228 A    7/1994  Krebs
5,529,341 A *  6/1996  Hartigan ................. B60R 21/06
                                                    280/749

(Continued)

FOREIGN PATENT DOCUMENTS

CN    104044552 A    9/2014
CN    107662569 A    2/2018
(Continued)

OTHER PUBLICATIONS

Oct. 16, 2018 European Search Report issue on International Application No. EP18185957.
(Continued)

*Primary Examiner* — Frank B Vanaman
(74) *Attorney, Agent, or Firm* — Clements Bernard Walker; Christopher L. Bernard

(57) ABSTRACT

A restraining system for restraining an occupant of a vehicle, the system including: an occupant supporting device for supporting the occupant, the occupant supporting device has a longitudinal direction along which an occupant is intended to be positioned; a blanket including at least one restraint belt including a first end and a second end attachable to attachment members arranged on either side of the occupant supporting device such that the at least one restraint belt extends in a transverse direction across the occupant supporting device, the attachment members are movable such that the position of the at least one restraint belt is adjustable in the longitudinal direction, an activation control unit configured to receive a signal indicative of a vehicle collision, and in response to the received signal control a pre-tension device to increase the tension in the at least one restraint belt.

10 Claims, 7 Drawing Sheets

(51) Int. Cl.
  *B60R 21/013* (2006.01)
  *B60R 22/20* (2006.01)
  *B60R 22/46* (2006.01)
  *B60N 3/00* (2006.01)
  *B60R 21/01* (2006.01)
  *G05D 1/02* (2020.01)

(52) U.S. Cl.
  CPC .............. *B60R 22/46* (2013.01); *B60N 3/008* (2013.01); *B60R 2021/01272* (2013.01); *B60R 2022/207* (2013.01); *B60R 2022/208* (2013.01); *G05D 1/021* (2013.01)

(58) Field of Classification Search
  CPC .... B60R 2021/01272; B60R 2022/207; B60R 2022/208; B60R 2021/0034
  See application file for complete search history.

(56) References Cited

U.S. PATENT DOCUMENTS

| | | | | |
|---|---|---|---|---|
| 5,727,814 | A * | 3/1998 | White | B60R 22/14 280/748 |
| 5,876,059 | A | 3/1999 | Kleinberg | |
| 7,654,613 | B2 | 2/2010 | Bass | |
| 2001/0008337 | A1 * | 7/2001 | Ganesan | B60R 22/02 280/801.1 |
| 2002/0125702 | A1 * | 9/2002 | Ohhashi | D04B 21/205 280/733 |
| 2005/0173909 | A1 * | 8/2005 | Langhoff | B60R 21/02 280/749 |
| 2006/0055158 | A1 * | 3/2006 | Park | B60R 21/18 280/733 |
| 2009/0200818 | A1 | 8/2009 | Giesa et al. | |
| 2012/0187671 | A1 | 7/2012 | Friedman | |
| 2016/0059819 | A1 * | 3/2016 | Witt | B60R 22/12 280/733 |
| 2018/0361899 | A1 * | 12/2018 | Baroody | B60N 3/00 |

FOREIGN PATENT DOCUMENTS

| | | |
|---|---|---|
| DE | 102014213301 A1 | 1/2016 |
| FR | 2859432 A1 | 3/2005 |
| GB | 1388156 A | 3/1975 |
| WO | 2014031109 A1 | 2/2014 |

OTHER PUBLICATIONS

Office action and search report issued in the corresponding CN application No. 201910653084.1.

* cited by examiner

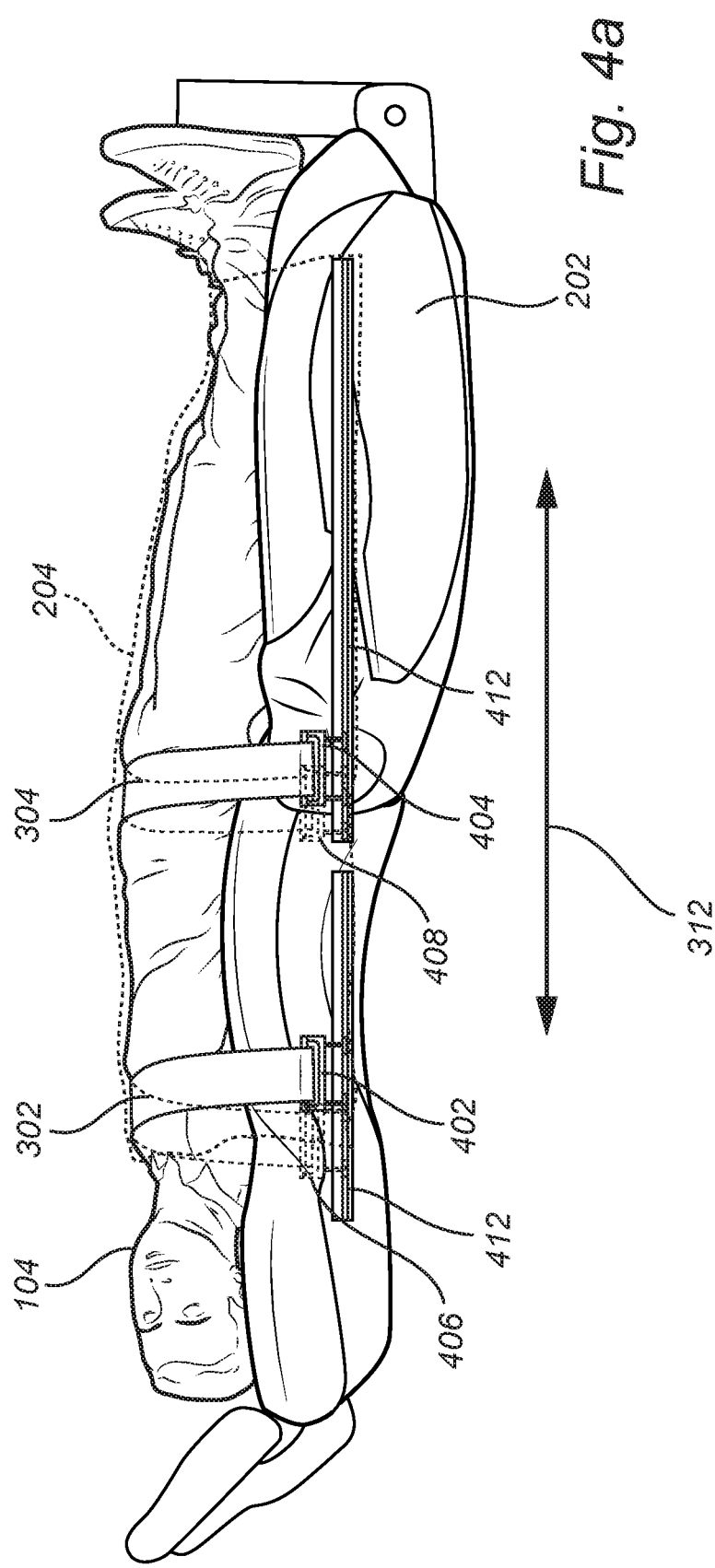

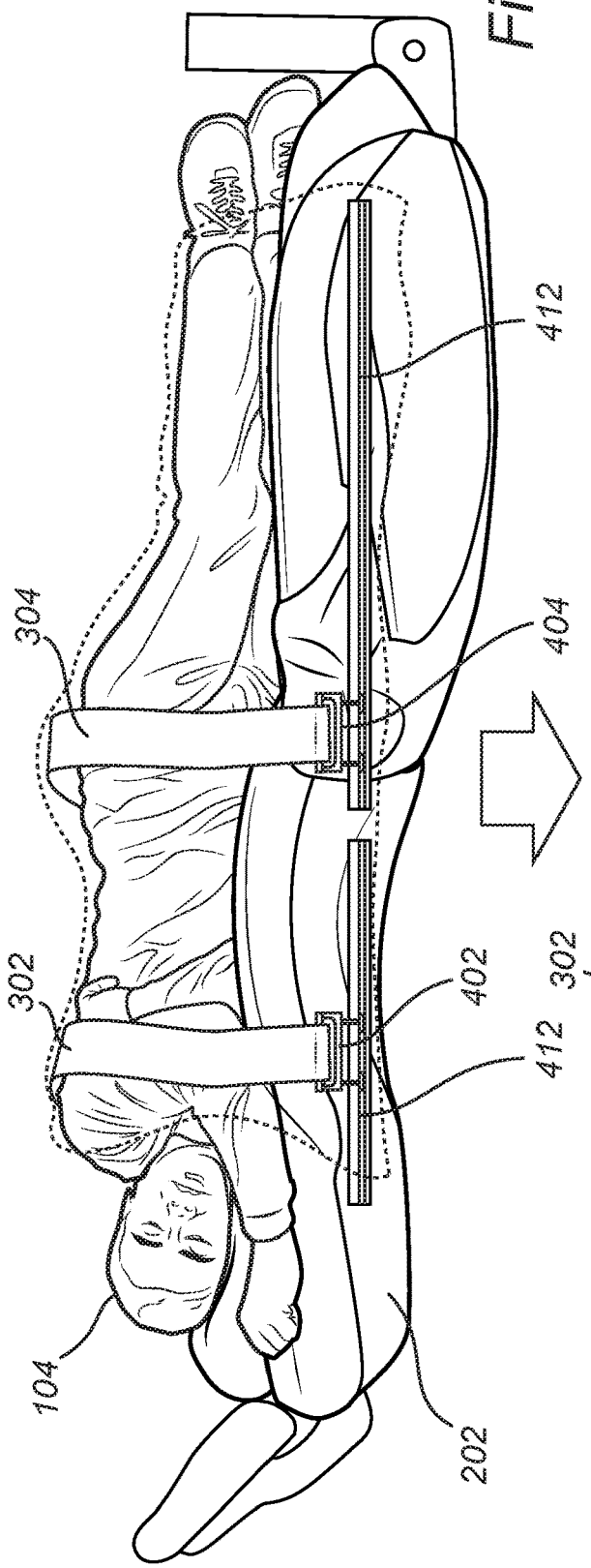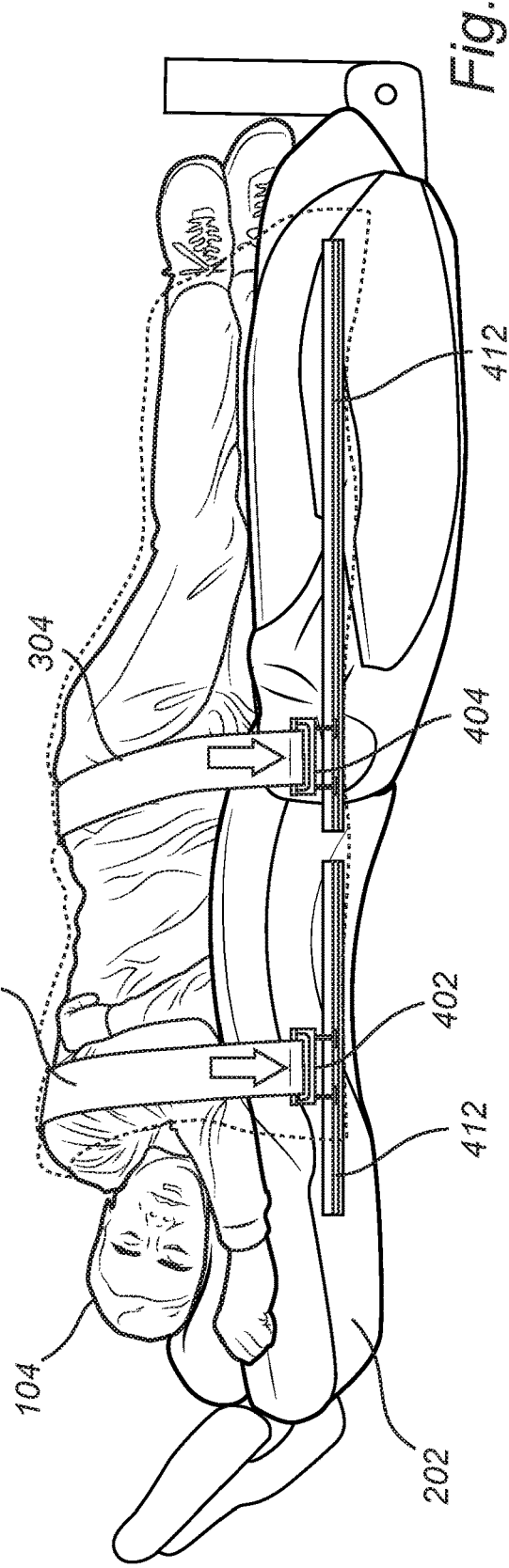

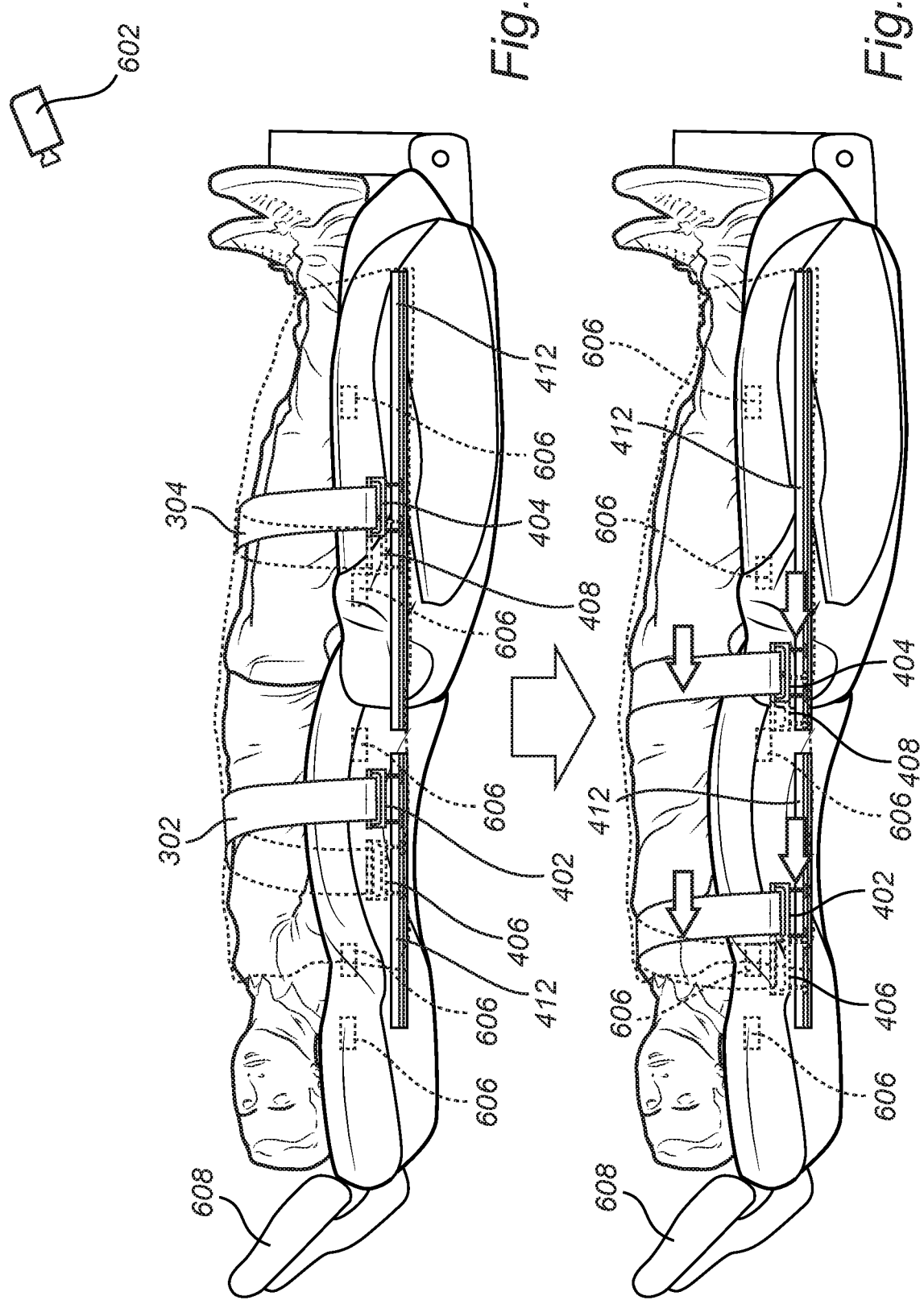

RESTRAINING SYSTEM FOR A VEHICLE

CROSS-REFERENCE TO RELATED APPLICATION

The present disclosure claims the benefit of priority of European Patent Application No. 18185957.0, filed on Jul. 27, 2018, and entitled "A RESTRAINING SYSTEM FOR A VEHICLE," the contents of which are incorporated in full by reference herein.

TECHNICAL FIELD

The present disclosure relates to a restraining system for restraining an occupant of a vehicle in the event of a collision.

BACKGROUND

Safety in the automotive industry is of high importance. Most modern vehicles today have advanced restraint systems including airbags for a variety of impact situations and advanced safety belts with pretension devices and load limiter functionalities for protection of the vehicle occupants. In addition, vehicles are equipped with internal and external sensors which are used to provide collision warnings or even automatic braking or steering in case of a potential crash, helping to avoid the crash or mitigate the consequences of the crash.

US2015084315 discloses one example of an airbag system in which the airbag includes several zones for covering different parts of the occupant in the deployed state of the air bag.

Future fully autonomous cars will probably be used to transport one or several occupants on longer trips—to some extent replacing trains and airplanes. In such and other situations, it is likely that the occupants want to lay flat resting or sleeping. However, these cars could be exposed to a crash, hence the occupants, when laying flat, need to be protected for any crash situation.

Conventional restraints, such as safety belts and airbags for instance the air bag system described in US2015084315, may not offer sufficient protection, nor will the traditional safety belts allow for optimal comfort. The general protection principles of a human in a crash will not change, but need to be adapted for the horizontal posture of the occupant. In addition, just as important is ensuring usage every time.

Accordingly, there is a need for improved restraint systems for vehicles that allow horizontal posture for the occupant.

SUMMARY

In view of above, it is an object of the present disclosure to provide improved restraint systems for a vehicle which allow a horizontal posture for the occupant without compromising safety and comfort for the occupant.

According to a first aspect of the disclosure there is provided a restraining system for restraining an occupant of a vehicle in the event of a collision, the system including: an occupant supporting device for supporting the occupant while travelling in the vehicle, the occupant supporting device has a longitudinal direction along which an occupant is intended to be positioned when in use; a blanket including at least one restraint belt, each restraint belt including a first end and a second end attachable to attachment members arranged on either side of the occupant supporting device such that each restraint belt extend in a transverse direction across the occupant supporting device, wherein the attachment members are movable such that the position of each restraint belt is adjustable in the longitudinal direction, and an activation control unit configured to receive a signal indicative of a vehicle collision, and in response to the received signal control a pre-tension device to increase the tension in the at least one restraint belt.

The present disclosure is based on the realization that a blanket may be provided with restraint belts which are attached on either side of the occupant supporting device. The blanket provides comfort for the occupant at the same time as providing safety by the restraint belts. Furthermore, the disclosure is based on the realization that the position of the restraint belt may be adjusted in a longitudinal direction such that different occupant sizes and postures may be accommodated for. In this way, the restraint belt ensures that the occupant may be held tightly across strong body parts when the pre-tension device tightens the restraint belt.

An occupant supporting device is adapted for supporting the occupant in a seated position and/or a lying down position. The occupant supporting device may for example be adjustable such that it allows for both a seated position and a lying down position of the occupant. Alternatively, the occupant supporting device only allows for a lying down position. A lying down position provides a horizontal posture of the occupant.

The occupant supporting device has a longitudinal direction along which the occupant, i.e. a human occupant is meant to be placed in a lying down horizontal posture. The restraint belts are arranged such that they extend in a transverse direction across the occupant seating device. Thereby, when an occupant is positioned as intended in the occupant supporting device, the restraint belt extends in a sideways/transverse direction across the occupant, i.e. in a left-right/right-left direction and not in a lengthwise direction of the occupant.

The longitudinal direction is along an elongated extension of the occupant supporting device, as opposed to the transverse extension of the occupant supporting device.

The occupant supporting device may include a soft surface to provide a comfortable feeling for the occupant.

The blanket may be provided as one or several sheets of fabric and be adapted to provide comfort for the occupant. For instance, the blanket may provide a comfortable feeling for sleeping or resting in the vehicle. The blanket may be equipped with climate control such as for providing addition heat for the occupant.

The activation control unit is configured to receive a signal indicative of a vehicle collision. The indication may be a predicated vehicle collision such that preventive actions may be pursued such as automatic breaking, automatic steering for crash mitigation or avoidance, or sensing for restraint activation, etc. The pre-tension device increases the tension in the at least one restraint belt. The increase of tension may be caused by pulling on at least one side of the respective restraint belt.

The pre-tension device may include conventional pyrotechnical charges for enabling fast tensioning of the restraint belt in response to a vehicle collision. Further, the pre-tension device may alternatively or additionally be configured to pull, for example with the help of pyrotechnical charges, the attachment members downwards in response to a detected collision such as to tension the restraint belts.

Sensors that may be able provide sensing data for predicting or detecting a collision include accelerometers, gyroscopes, LIDAR, radar, cameras, etc.

In embodiments, the restraining system may include at least two restraint belts. Hereby, the occupant is restraint in at least two body locations in the event of a collision or predicted collision, thereby providing increased safety for the occupant.

In embodiments, the attachment members may be movable by sliding the attachment members in guiding rails. With guiding rails the attachment members may be moved to arbitrary position along the guiding rail and thereby provides a flexible solution for positioning the attachment members and therefore also positioning of the restraint belts.

In embodiments, the attachment members may be movable such that one restraint belt may be located at an upper-torso level and one restraint belt may be located at the pelvis level of an occupant positioned in a neutral position in the occupant supporting device. The upper-torso level and the pelvis level are strong body parts which are suitable body parts where the occupant may be restrained if needed. Thus, it is advantageous to be able to adjust the position of the restraint belts to the location of the occupant's upper-torso level and to the pelvis level.

In embodiments, the attachment members may be automatically moved to a predetermined position based on detected body features of the occupant. For instance, the body posture and/or body size and shape may be detected using e.g. weight or pressure sensors in the occupant supporting device, image capturing devices including RGB cameras and/or IR cameras, and/or LIDAR in the vehicle interior space or combination of sensors and image capturing devices or LIDARs. Based on the detected body posture and/or body size and body shape, the attachment members may be adjusted by a vehicle control unit configured to adjust the positions of the attachment members along the longitudinal direction, so that the restraint belts are positioned over preferred body parts of the occupant.

Furthermore, in case the occupant moves the attachment members may be moved in the longitudinal directions based on a detected variation in body posture of the occupant in the occupant supporting device to maintain the restraint belts at preferred body positions.

The attachment members may be movably attached to a vehicle structure below the occupant supporting device, or directly to the occupant supporting device. In this way, the restraint belts may be tightly arranged with respect to the occupant. Preferably, the attachment members are movably attached to the floor structures of the vehicle such as underlying beam structures below the occupant supporting device.

In embodiments, the restraint belts may be integrated in the blanket. This provides increased comfort for the occupant. That the restraint belts are integrated should be interpreted as that they are placed in pockets in the blanket and that the restraint belts are replaceable. In other words, the restraint belts may be removed from the blanket and replaced by new restraint belts. Alternatively, the restraint belts may be removed from the blanket, whereby the blanket is replaced by a new blanket.

In embodiments, the occupant supporting device may be a vehicle seat or vehicle bed. The vehicle seat is preferably fully reclinable such that the occupant may take a horizontal posture.

In embodiments, the restraining system may include an electrical reversible restraining device configured to reversibly tension the restraint belts. The reversible tensioning may be performed in response to a received signal indicative of a predicted vehicle collision. The signal may be received by the activation control unit controlling the electrical reversible restraining device. Accordingly, the tension in the restraint belts may be continuously adjusted based on for instance a detected traffic situation that may be considered hazardous for the vehicle. If a prediction for a vehicle collision is increasing to above a threshold then the tension in the restraint belt may be increased somewhat. If the prediction for a vehicle collision is subsequently decreasing, the tension in the restraint belt may be decreased.

In addition, the activation control unit may receive a signal indicative of a personal setting of the tension of the restraint belts. For example, an occupant may prefer to have the restraint belts more tightly than other occupants. A personal setting signal may then be received by the activation control unit which controls the electrical reversible restraining device to adjust the tension in the restraint belts. The tightness of the restraint belts may thus be adjusted to comfortably accommodate different occupant sizes and postures.

In embodiments, the at least one restraint belt may be inflatable, wherein the restraint belts may be configured to be inflated in response to the signal indicative of a vehicle collision. Thereby an additional tensioning effect is provided in addition to the tension provided by the pre-tensioning device. The inflatable belts may be inflated by an inflation unit including compressed gas.

In embodiments, the occupant supporting device may include a frame structure extending vertically from the surface configured to support the occupant; the frame portion is configured to restrict the horizontal motion of the occupant when in the occupant supporting device. In this way, the horizontal motion of the occupant is restricted both in the lateral and longitudinal directions as a complement to the restraint belts. The frame structure may be adaptable and be adjusted in shape and position.

According to a second aspect of the disclosure, there is provided a vehicle including a restraining system according to any one of the embodiments of the first aspect.

The vehicle may be an autonomous vehicle.

This second aspect of the disclosure provides similar advantages as discussed above in relation to the previous aspect of the disclosure.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other aspects of the present disclosure will now be described in more detail, with reference to the appended drawings showing example embodiments of the disclosure, wherein:

FIG. 4a conceptually illustrates a side view of an occupant situated in an occupant supporting device;

FIG. 5a-b conceptually illustrates the tensioning of restraint belts; and

FIG. 6a-b conceptually illustrates adjusting the positions of the attachment members.

DESCRIPTION OF EMBODIMENTS

Figure 1:
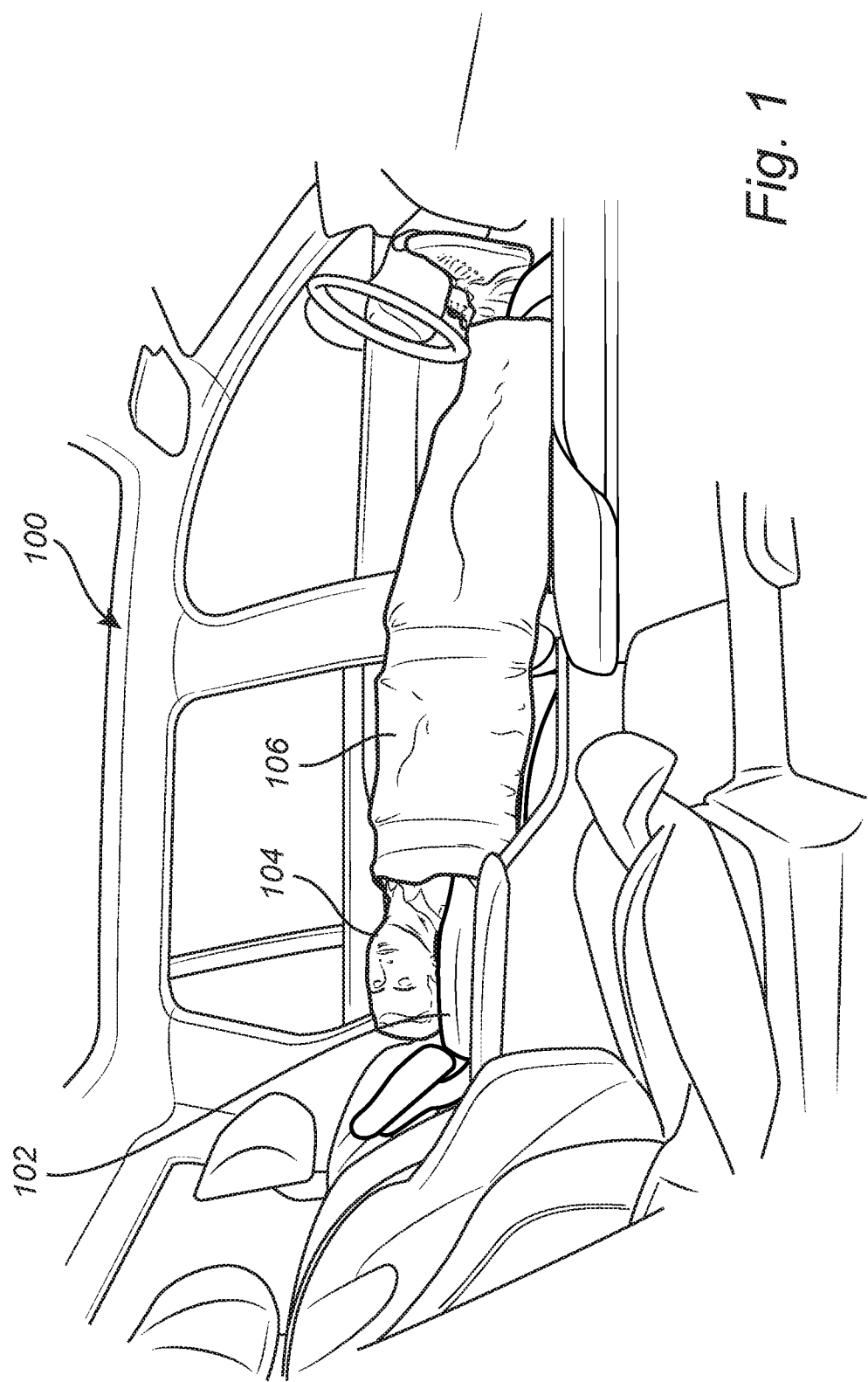
FIG. 1 conceptually illustrates an exemplary vehicle according to embodiments of the disclosure.

In the present detailed description, various embodiments of the system and method according to the present disclosure are mainly described with reference to a vehicle in the form of a car. However, the present disclosure is equally well applicable to other vehicles such as trucks and busses, etc. In addition, the embodiments are related to systems with two restraint belts. The system according to the present disclosure may equally well include more than two restraint belts, or a single restraint belt. Thus, this disclosure may generally be embodied in many different forms and should not be construed as limited to the embodiments set forth herein; rather, these embodiments are provided for thoroughness and completeness, and fully convey the scope of the disclosure to the skilled person. Like reference characters refer to like elements throughout.

FIG. 1 illustrates a vehicle in the form of a car 100. The car 100 may be an autonomous vehicle. The car 100 includes an occupant supporting device 102 as part of a restraining system. Here, the occupant supporting device 102 is shown as a vehicle seat 102 which is fully reclinable to a horizontal orientation and extended to provide full length support for the occupant 104. This enables the occupant 104 to lie down when travelling in the car 100.

When vehicles are provided as an autonomous car 100, it becomes more convenient to travel longer distances with cars since no person has to drive the autonomous car 100. Thereby, the occupants such as occupant 104 of the car may enjoy the traveling laying down, as shown in FIG. 1. The occupant 104 has a blanket 106 to cover himself/herself and to make the travelling more comfortable, in particular if the occupant 104 wishes to sleep. As will be described with reference to subsequent drawings the blanket includes restraint belts which may be tensioned in case of a predicted or detected collision with the car 100.

Figure 2:
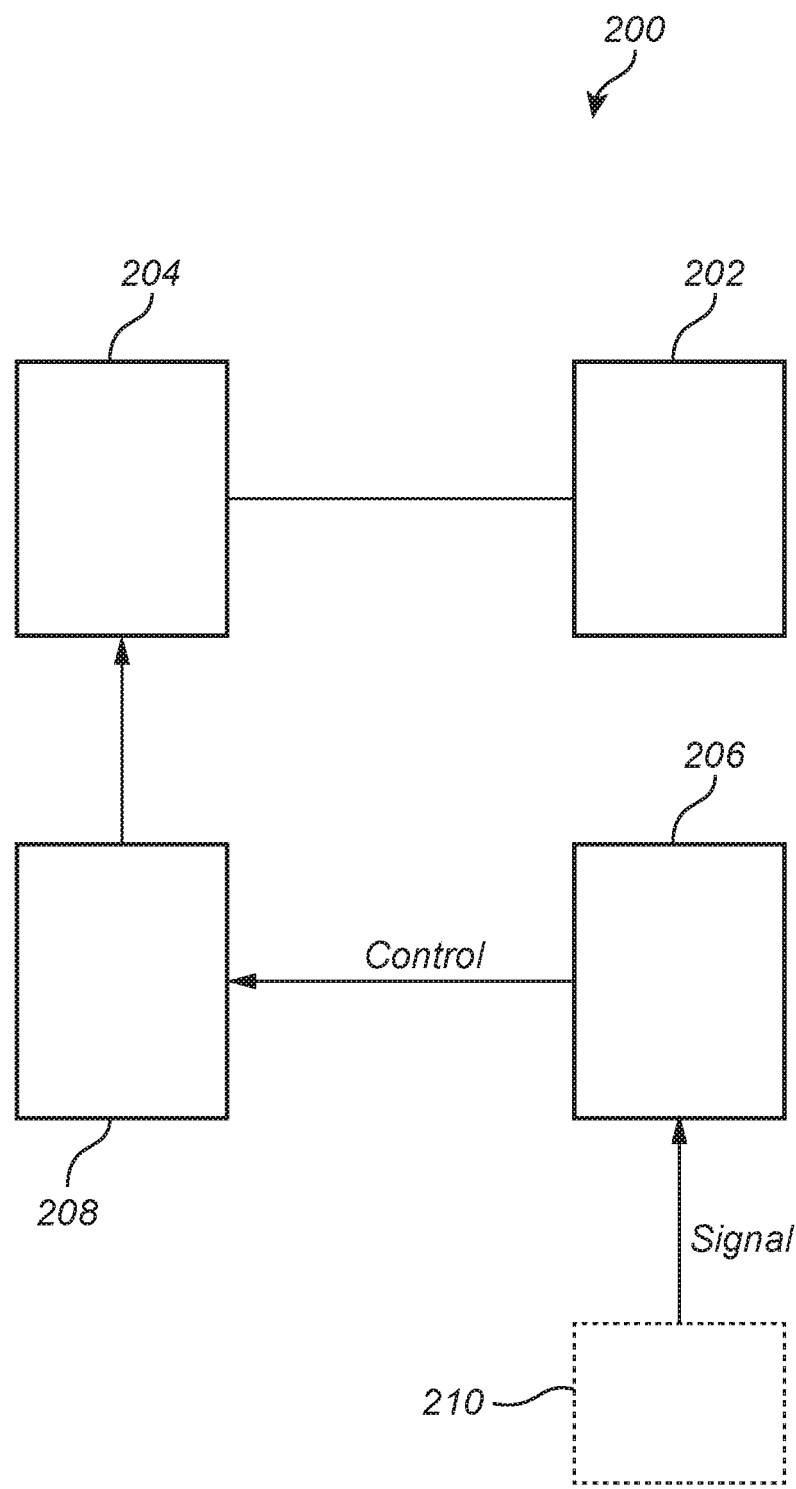
FIG. 2 is a box diagram of an exemplary system according to embodiments of the disclosure.

FIG. 2 shows a box diagram of a restraining system 200 according to embodiments of the disclosure. The restraining system 200 includes an occupant supporting device 202 adapted to support an occupant when travelling in the vehicle. Furthermore, the restraining system 200 includes a blanket 204. The blanket 204 and the occupant supporting device 202 are only conceptually shown in FIG. 2 for completeness of the description. The blanket 204 includes at least one restraint belt (not shown in FIG. 2) arranged with its end portions attachable to attachment members arranged on either side of the occupant supporting device 202.

The restraining system 200 also includes an activation control unit 206 configured to receive a signal indicative of a vehicle collision. The vehicle collision may either be a predicted collision or a detected collision. In response to the received signal, the activation control unit 206 sends a control signal to a pre-tension device 208 of the system 200. In this way, the activation control unit 206 is configured to control the pre-tension device 208 to increase the tension in the at least one restraint belt of the blanket 204 by applying a pulling force on at least one end of the respective restraint belt.

The activation control unit 206 may receive the signal indicative of a vehicle collision from other safety systems 210 or sensors 210 of the vehicle. Sensors that may be able to provide sensing data for predicting a collision or determining that a crash is occurring include accelerometers, gyroscopes, LIDAR, radar, cameras, etc.

Figure 3:
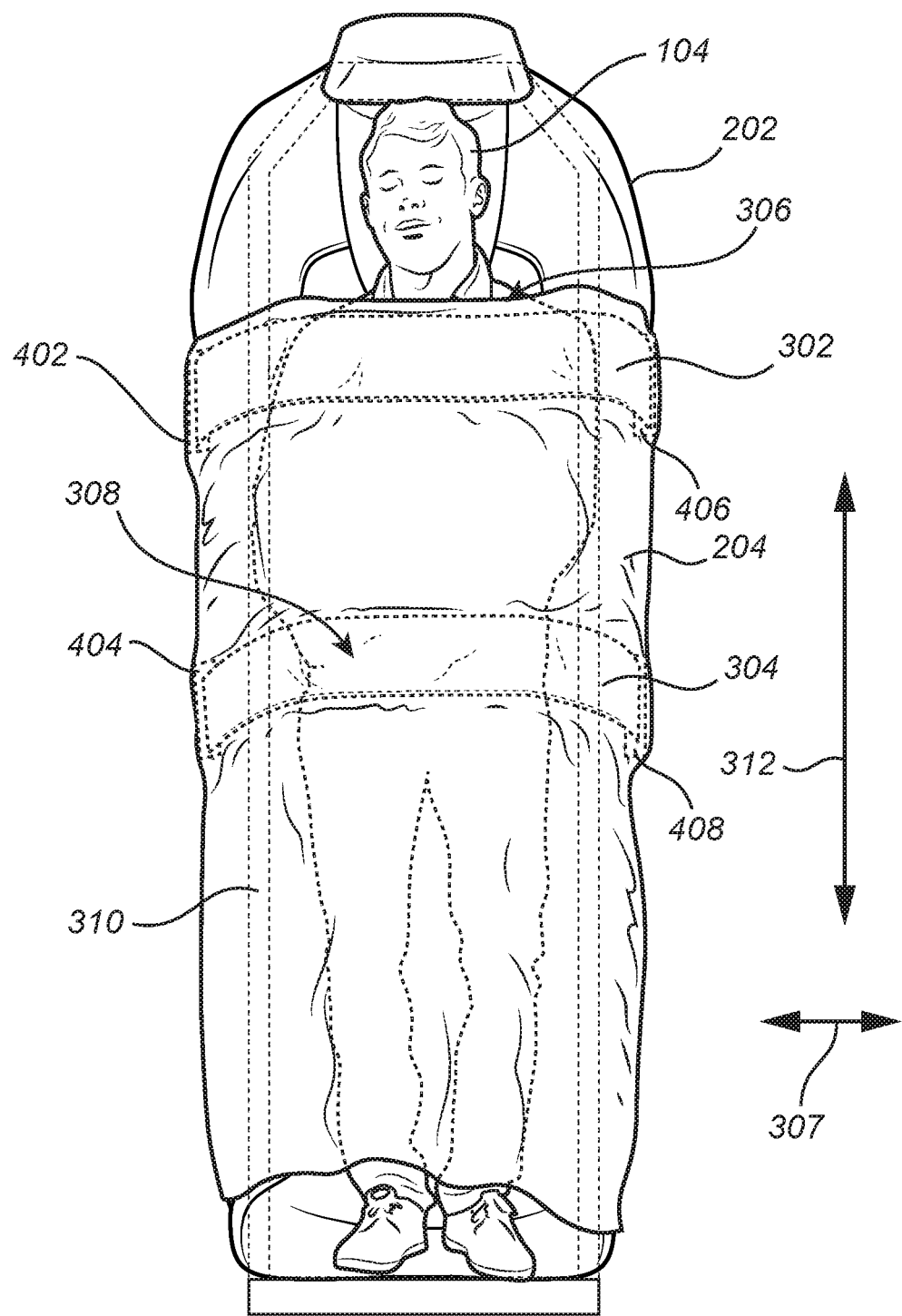
FIG. 3 conceptually illustrates a top view of an occupant situated in an occupant supporting device.

FIG. 3 conceptually illustrates a top view of an occupant 104 situated in an occupant supporting device 202. In this example embodiment the occupant supporting device 202 is provided as a bed mountable in a vehicle. The bed may include a soft surface, e.g. a mattress supporting the occupant.

The occupant supporting device 202 has a longitudinal extension 312 along which the occupant 104 is resting with his/her lengthwise extension. Thus, the occupant 104 is placed with the feet-head orientation along the longitudinal extension of the occupant supporting device 202.

A blanket 204 is here shown covering at least part of the occupant 104. The blanket 204 includes two restraint belts. The restraint belts 302 and 304 are attachable to attachment members 402, 404, 406, 408 on either side of the occupant supporting device 202. Thereby, the restraint belts are arranged along the transverse direction 307 across the occupant supporting device 202.

A first restraint belt 302 is here shown located across the upper-torso level 306 of the occupant 104. A second restraint belt 304 is here shown located across the pelvis level 308 of the occupant 104. The upper torso level 306 and the pelvis level 308 are strong body parts which are therefore preferred locations for the restraint belts 302, 304.

Optionally, according to some embodiments, the occupant supporting device 202 includes a frame structure 310 arranged near the outer perimeter of the occupant supporting device 202. The frame portion 310 is adapted to provide support for the occupant 104. More precisely, the frame portion 310 is adapted to restrict the horizontal motion of the occupant 104 located in the occupant supporting device 202. The frame portion 310 extends vertically from the supporting surface for the occupant on the occupant supporting device 202.

FIG. 4a conceptually illustrates a side view of the occupant 104 situated in the occupant supporting device 202 in FIG. 3. FIG. 4a further illustrates attachment members 402 and 404 on a first side of the occupant supporting device 202. Similar attachment members 406 and 408 are analogously arranged on a second side of the occupant supporting device 202, opposite the first side.

The attachment members 402 and 404 are attached to a first end portion of a respective restraint belt 302, 304. Moreover, the attachment members 406 and 406 on the opposite side are attached to a second end portion of a respective restraint belt 302, 304. On at least one of the sides the restraint belts are releasably attachable to the attachment members, for example on the depicted side showing the attachment members 402 and 404. In this way, the blanket 204 may be removed from the occupant supporting device 202 such that the occupant may be positioned in the occupant supporting device 202. Next, the blanket may be placed over the body of the occupant 104 and the restraint belts 302, 304 attached to the attachment members 402, 404, 406, 408.

The position of the attachment members 402, 404, 406, 408 may be adjusted in the longitudinal direction 312. In this way it is possible to adjust the location of the restraint belts 302, 304 to be placed across preferred body parts of the occupant 104.

The restraint belts 302, 304 are tensioned when travelling with the vehicle with such that they are held in place in the desired location but not restrict motion of the occupant. In the event of a predicted or detected collision, the tension in the restraint belts 302, 304 is increased to firmly hold the occupant 104 in place.

Figure 4B:
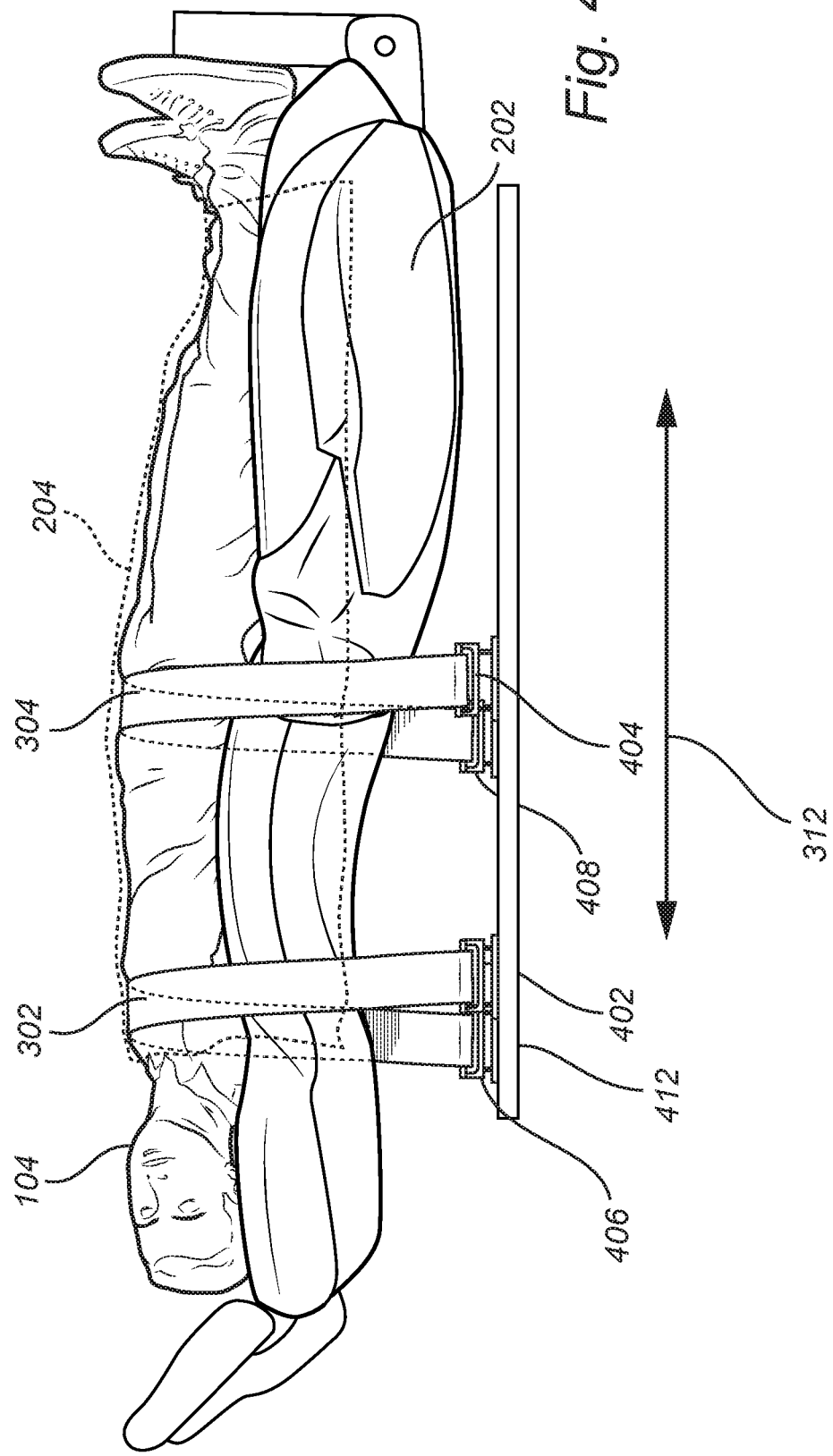
FIG. 4b conceptually illustrates a side view of an occupant situated in an occupant supporting device according to another embodiment.

The attachment members 402, 404, 406, 408 may be movable by sliding them in respective guiding rails 412. The guiding rails may be attached to the sides of the occupant supporting device 202 or on the vehicle floor just underneath the occupant supporting device as illustrated in FIG. 4b. The attachment members may for instance include slider feet that matches a rail profile of the guiding rails 412 such that the slider feet may slide along the guiding rail but not be released in the vertical direction of the guiding rail 412. Once the attachment members 402, 404, 406, 408 are in a desired location in the rails 412, they are locked in that position.

Other possible guiding means may be a guiding posts on which the attachment members 402, 404, 406, 408 may slide and be attached at preferred locations.

The restraint belts 302, 304 may include mating attachment devices on each end portion. The mating attachment devices are releasably attachable to the attachment members. The mating attachment devices may be conventional buckles and the attachment member may thus be a buckle receiver including a pretension device.

FIG. 5a-b conceptually illustrates the tensioning of restraint belts in the event that the activation control unit receives a signal indicative of a vehicle collision. In FIG. 5a, the restraint belts 302 and 304 are tensioned such that they are held in placed in the desired location, over strong body parts of the occupant, but not restrict motion of the occupant 104 located on the occupant supporting device 202, here shown as a bed 202. The occupant 104 is resting on his/her side on the bed 202. The restraint belts 302 and 304 may in this situation be loose enough for the occupant 104 to be able to turn over on the occupant supporting device 202.

In the event that the activation control unit receives a signal indicative of a vehicle collision, the activation control unit controls a pre-tension device to increase the tension in the restraint belts 302, 304. Thus, as shown in FIG. 5b, the occupant 104 is held firmly in place by the restraint belts 302, 304. The restraint belts 302, 304 may be rolled up in a roller on at least one of their sides for increasing the tension. Moreover, the attachment members 402, 404, 406, 408 may be repositioned to increase the tension in the restraint belts 302, 304. In other words, by moving the pairs of attachment members 402, 404, 406, 408 the restraint belts 302, 304 may be stretched across the occupant and in this way the tension is increased in the restraint belts 302, 304. The attachment members may be quickly (e.g. 1-100 ms) moved downwards away from the occupant supporting device 202.

In order to tension the restraint belts the pre-tension device may include conventional pyrotechnical charges for quickly rolling the restraint belts on the respective roller and/or for pulling the attachment members downwards along with the guiding rails 412.

FIG. 6a-b illustrates adjusting the positions of the attachment members 402, 404 on one side of the occupant supporting device 202. The positioning of the attachment members on the other side is analogous to the positioning of the attachment members 402 and 404.

In FIG. 6a the occupant 104 has placed himself/herself on the occupant supporting device 202, here shown as a vehicle bed 202. The restraint belts 302 and 304 are arbitrarily located with respect to the occupant's body parts and in suboptimal locations from a safety perspective.

Pressure or weight sensors 606 arranged in or under the occupant supporting device 202 are configured to sense the presence of the occupant on the occupant supporting device 202. Further, the pressure or weight sensors 606 can sense the weight distribution of the occupant 104 on the occupant supporting device 202 to thereby determine the location of for instance the upper torso and the pelvis of the occupant.

In some embodiments, a camera 602 may be arranged to capture image data of the occupant. From the image data it is possible to locate the occupant's body parts, such as the upper torso and the pelvis.

Based on the sensor data from the pressure/weight sensors 606 and/or the image data from the camera 602, a vehicle control unit may control a linear translation device including a rack-pinion configuration to move the attachment members 402, 404 such that they are located at preferred locations. For instance such that the restraint belts 302 and 304 are positioned at the upper torso level and the pelvis level as shown in FIG. 6b. Moving the attachment members may be performed by electric motors causing the attachment members to slide in the rails. The attachment members may be attached to a rack included in the rails 412. A pinion electrically controlled by an electric motor may cause the rack to be linearly translated in the rail along the rack. Thus, a rack-pinion configuration may be used for translating the attachment members in a linear motion in guiding rails.

In some possible implementations, the location of the head rest 608 may be used as a reference for moving the restraint belts 302, 304. Thus, the repositioning of at least the restrain belt 302 intended to be placed at the upper torso level of the occupant 102 is repositioned to a predetermined position relative the head rest 608, i.e. at a predetermined distance from the head rest 608.

The blanket in various embodiments may be replaced depending of personal preferences. The restraint belts may be integrated in the blanket by placing them in pockets of the blanket. Thus, the restraint belts may be removed from the blanket and the blanket be replaced by another blanket. The blanket may include climate control such as heating means.

The control functionality of the present disclosure may be implemented using existing computer processors, or by a special purpose computer processor for an appropriate system, incorporated for this or another purpose, or by a hardwire system. Embodiments within the scope of the present disclosure include program products including machine-readable medium for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The person skilled in the art realizes that the present disclosure by no means is limited to the preferred embodiments described above. On the contrary, many modifications and variations are possible within the scope of the appended claims. For instance, the number of restraint belts may be other than the two restraint belts depicted in the drawings. The number of restraint belts may for example be one, two, three, four, five, six, etc.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A restraining system for restraining an occupant of a vehicle in the event of a collision, the system comprising:
   an occupant supporting device for supporting the occupant while travelling in the vehicle, the occupant supporting device has a longitudinal direction along which an occupant is intended to be positioned when in use;
   a blanket comprising at least one restraint belt comprising a first end and a second end attachable to attachment members arranged on either side of the occupant supporting device such that the at least one restraint belt extends in a transverse direction across the occupant supporting device,
   wherein the attachment members are movable such that the position of the at least one restraint belt is adjustable in the longitudinal direction; and
   an activation control unit configured to receive a signal indicative of a vehicle collision, and in response to the received signal control a pre-tension device to increase the tension in the at least one restraint belt,
   wherein the attachment members are automatically moved to a predetermined position based on detected body features of the occupant.

2. The restraining system of claim 1, wherein the attachment members are movable by sliding the attachment members in guiding rails.

3. The restraining system of claim 1, comprising at least two restraint belts, wherein the attachment members are movable such that one restraint belt may be located at an upper-torso level and one restraint belt may be located at the pelvis level of an occupant positioned in a neutral position in the occupant supporting device.

4. The restraining system of claim 1, wherein the attachment members are movably attached to a vehicle structure below the occupant supporting device, or directly to the occupant supporting device.

5. The restraining system of claim 1, wherein the at least one restraint belt is integrated in the blanket.

6. The restraining system of claim 1, wherein the occupant supporting device is a vehicle seat or vehicle bed.

7. The restraining system of claim 1, comprising an electrical reversible restraining device configured to reversibly tension the at least one restraint belt.

8. The restraining system of claim 1, wherein the pretension device is configured to pull the attachment members downwards in response to a detected collision.

9. The restraining system of claim 1, wherein the at least one restraint belt is inflatable, wherein the at least one restraint belt is configured to be inflated in response to the signal indicative of a vehicle collision.

10. The restraining system of claim 1, wherein the occupant supporting device comprises a frame structure extending vertically from the surface configured to support the occupant, the frame structure is configured to restrict the horizontal motion of the occupant when in the occupant supporting device.

* * * * *